United States Patent
Ikuta et al.

(10) Patent No.: US 10,721,923 B2
(45) Date of Patent: Jul. 28, 2020

(54) DUAL-BEARING REEL

(71) Applicant: Shimano Inc., Sakai, Osaka (JP)

(72) Inventors: Takeshi Ikuta, Sakai (JP); Kunio Takechi, Sakai (JP); Yohei Toake, Sakai (JP); Shunsaku Asaka, Sakai (JP); Kohei Nakamura, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 127 days.

(21) Appl. No.: 16/160,016

(22) Filed: Oct. 15, 2018

(65) Prior Publication Data

US 2019/0150418 A1 May 23, 2019

(30) Foreign Application Priority Data

Nov. 22, 2017 (JP) ................................. 2017-224466

(51) Int. Cl.
*A01K 89/01* (2006.01)
*A01K 89/033* (2006.01)
*A01K 89/015* (2006.01)

(52) U.S. Cl.
CPC .......... *A01K 89/05* (2015.05); *A01K 89/0178* (2015.05); *A01K 89/01903* (2015.05); *A01K 89/01915* (2015.05)

(58) Field of Classification Search
CPC ............ A01K 89/0155; A01K 89/0182; A01K 89/01903; A01K 89/01915; A01K 89/059
See application file for complete search history.

(56) References Cited

U.S. PATENT DOCUMENTS

| 6,286,773 | B1 * | 9/2001 | Ikuta | A01K 89/059 |
| | | | | 242/260 |
| 2005/0162976 | A1 * | 7/2005 | Kuriyama | G01S 15/06 |
| | | | | 367/111 |
| 2006/0169813 | A1 * | 8/2006 | Nakagawa | A01K 89/01555 |
| | | | | 242/288 |
| 2011/0315802 | A1 * | 12/2011 | Kuriyama | A01K 91/20 |
| | | | | 242/283 |
| 2012/0318902 | A1 * | 12/2012 | Kawabe | A01K 89/057 |
| | | | | 242/298 |
| 2014/0110517 | A1 * | 4/2014 | Niitsuma | A01K 89/01555 |
| | | | | 242/288 |
| 2015/0296762 | A1 * | 10/2015 | Haraguchi | A01K 89/0186 |
| | | | | 242/261 |
| 2016/0100563 | A1 * | 4/2016 | Maruoka | A01K 89/0155 |
| | | | | 242/295 |
| 2016/0345558 | A1 * | 12/2016 | Niitsuma | A01K 89/0155 |
| 2016/0345560 | A1 * | 12/2016 | Niitsuma | A01K 89/0155 |

(Continued)

FOREIGN PATENT DOCUMENTS

JP 09-275861 A 10/1997

*Primary Examiner* — Emmanuel M Marcelo
(74) *Attorney, Agent, or Firm* — United IP Counselors, LLC (57) ABSTRACT

A dual-bearing reel capable of reeling in and reeling out a fishing line includes a reel body, a spool, a spool shaft, an operating member, and an oscillating mechanism. The spool is rotatably supported by the reel body. The spool shaft supports the spool. The operating member is movably provided on the reel body and moves to perform an adjustment operation on a braking force that acts on the spool. The oscillating mechanism causes the fishing line to oscillate in the axial direction in synchronization with a rotation of the spool.

10 Claims, 7 Drawing Sheets

(56) References Cited

U.S. PATENT DOCUMENTS

| | | | | |
|---|---|---|---|---|
| 2017/0202192 A1* | 7/2017 | Niitsuma | ............ | A01K 89/0173 |
| 2017/0208789 A1* | 7/2017 | Numata | ............. | A01K 89/0182 |
| 2017/0245484 A1* | 8/2017 | Takechi | .............. | A01K 89/033 |
| 2018/0343842 A1* | 12/2018 | Misseri | ................ | A01K 89/046 |
| 2018/0368378 A1* | 12/2018 | Takechi | ................ | A01K 89/046 |
| 2019/0200592 A1* | 7/2019 | Niitsuma | ............ | A01K 89/0193 |

* cited by examiner

DUAL-BEARING REEL

CROSS-REFERENCE TO RELATED APPLICATIONS

This application claims priority to Japanese Patent Application No. 2017-224466, filed Nov. 22, 2017. The contents of that application are herein incorporated by reference in their entirety.

BACKGROUND

Technical Field

The present disclosure relates to a dual-bearing reel capable of reeling in and reeling out fishing line.

Background Information

Among dual-bearing reels, those provided with a spool-drag mechanism and a level-wind mechanism have conventionally been known. For example, in the spool-drag mechanism disclosed in Japanese Laid Open Patent Application No. H09-275861 (Patent Document 1), both ends of a spool shaft that rotates integrally with a spool are held by two plates to brake the rotation of the spool. Adjustment of the braking force is performed by an operating lever that can swing around the spool shaft. The level-wind mechanism has a line guide for guiding the fishing line, with the line guide moving back and forth in conjunction with the rotation of a handle. Thereby, the fishing line is uniformly wound around the spool.

In Patent Document 1, since the line guide moves back and forth in synchronization with the rotation of the handle rather than the rotation of the spool, when reeling out the fishing line, that is, when dropping a lure, the line guide remains stopped. As a result, most of the fishing line reeled out from the spool is fed out from a position different from that of the line guide in the left-right direction. When the position of the fishing line to be reeled out and the position of the line guide differ, the line guide exerts resistance when the fishing line is being reeled out, whereby the falling speed of the lure is lowered, and a stable falling speed cannot be obtained. When a stable falling speed cannot be obtained, particularly in fishing with a lure called a "tai rubber," enticing the fish to bite while the lure is dropping is difficult, leading to a poor catch.

BRIEF SUMMARY

It is an object of the present disclosure to enable a stable falling speed of a fishing line to be easily obtained when reeling out the fishing line.

A dual-bearing reel according to one aspect of the present disclosure is capable of reeling in and reeling out a fishing line, the dual-bearing reel provided with a reel body, a spool, a spool shaft, an operating member, and an oscillating mechanism. The spool is rotatably supported by the reel body. The spool shaft supports the spool. The operating member is movably provided on the reel body, and moves to perform an adjustment operation on a braking force that acts on the spool. The oscillating mechanism causes the fishing line to oscillate in an axial direction in synchronization with the rotation of the spool.

In this dual-bearing reel, since the oscillating mechanism causes the fishing line to oscillate in the axial direction in synchronization with the rotation of the spool, the oscillating mechanism moves in the axial direction in synchronization with the rotation of the spool, even when the fishing line is being reeled out. Thereby, the position of the fishing line reeled out from the spool and the position guidance of the fishing line of the oscillating mechanism are not displaced in the left-right direction. As a result, the fishing line can be smoothly reeled out from the spool, and a stable falling speed can be obtained. Based on such a configuration, since it is also possible to adjust the braking force acting on the spool by operating the operating member, the falling speed of the tackle can be easily adjusted.

The dual-bearing reel is preferably further provided with a display in the reel body, water depth calculating means for calculating the water depth of a tackle in accordance with rotation of the spool, and display control means for displaying in the display the water depth of the tackle calculated by the water depth calculating means. In this case, it is possible to quickly drop a tackle to a target water depth while checking the water depth of the tackle displayed in the display. Further, in the vicinity of the target water depth, the falling speed can be slowed by operating the operating member to increase the braking force. Thereby, it is possible to easily obtain a falling speed of the tackle suitable for the situation.

The dual-bearing reel is preferably further provided with speed calculating means for calculating at least the reeling-out speed of the fishing line according to the rotation of the spool, with the display control means able to display the speed calculated by the speed calculating means in the display. In this case, it is possible to easily adjust the reeling-out speed of the fishing line with the operating member while confirming the reeling-out speed of the fishing line displayed in the display.

The dual-bearing reel is preferably further provided with a first friction plate that makes contact with one end face of the spool shaft, and a second friction plate that makes contact with the other end face of the spool shaft. The spool shaft rotates integrally with the spool, and the operating member, by the movement thereof, adjusts the pressing force of each of the first and second friction plates against the spool shaft.

The dual-bearing reel is preferably further provided with an adjusting member that is provided to be movable in the axial direction of the spool shaft, and that moves in the axial direction to adjust the braking force acting on the spool. The operating member is attached to the adjusting member and is capable of swinging together with the adjusting member in the rotation direction of the adjusting member.

The operating member preferably has a mount that is integrally rotatable with and detachable from the adjusting member, and an operation body that extends radially outward from the mount and is inclined toward the inside of the reel body while extending radially outward.

The operation body of the operating member has a distal end that is able to protrude further outward in the radial direction than an upper surface of the reel body.

The oscillating mechanism preferably has a line guide that guides the fishing line. The line guide is disposed above the spool shaft when viewed from the side.

The oscillating mechanism preferably has: a shaft member that is rotatably supported by the reel body, has a spiral groove on the outer peripheral surface thereof, and extends in the axial direction of the spool shaft; and a sliding member that slides along the spiral groove. The oscillating mechanism is further provided with a rotation transmission mechanism that transmits the rotation of the spool to the shaft member of the oscillating mechanism.

The rotation transmission mechanism preferably reduces a rotation speed of the spool and transmits the rotation to the shaft member.

The rotation transmission mechanism preferably has a large-diameter gear that receives a rotational input from the spool, and a small-diameter gear that rotates concentrically and integrally with the large-diameter gear and that outputs a rotation to the shaft member.

According to the present disclosure, when reeling out a fishing line, it is possible to easily obtain a stable falling speed of the fishing line, and adjustment of the falling speed is easy.

DETAILED DESCRIPTION OF EMBODIMENTS

A dual-bearing reel 100 of a preferred embodiment of the present disclosure is capable of reeling out a fishing line in the forward direction. As illustrated in FIGS. 1 to 4, the dual-bearing reel 100 is provided with a reel body 2, a spool 3, a handle 4, a spool braking mechanism 20 (see FIG. 3), an operating member 30, an oscillating mechanism 40, and a counter unit 50. In the following description, when fishing is performed, the direction in which the fishing line is reeled out is referred to as the front and the opposite direction as the rear. In addition, "left" and "right" refer to left and right when the dual-bearing reel 100 is viewed from the rear. The direction in which the spool shaft 10 extends is referred to as the axial direction.

The reel body 2 has a frame 6, a first side cover 7, a second side cover 8, and a front cover 9. The frame 6 has a first side plate 6a, a second side plate 6b, and a plurality of connectors 6c. The first side plate 6a is disposed on the right side of the frame 6. The second side plate 6b is disposed on the left side of the frame 6, spaced apart from the first side plate 6a in the axial direction. On the outer side of the second side plate 6b in the axial direction, a support member 11 having a first boss 11a is affixed to the first side plate 6a. The plurality of connectors 6c extend in the axial direction and connect the first side plate 6a and the second side plate 6b.

Figure 2:
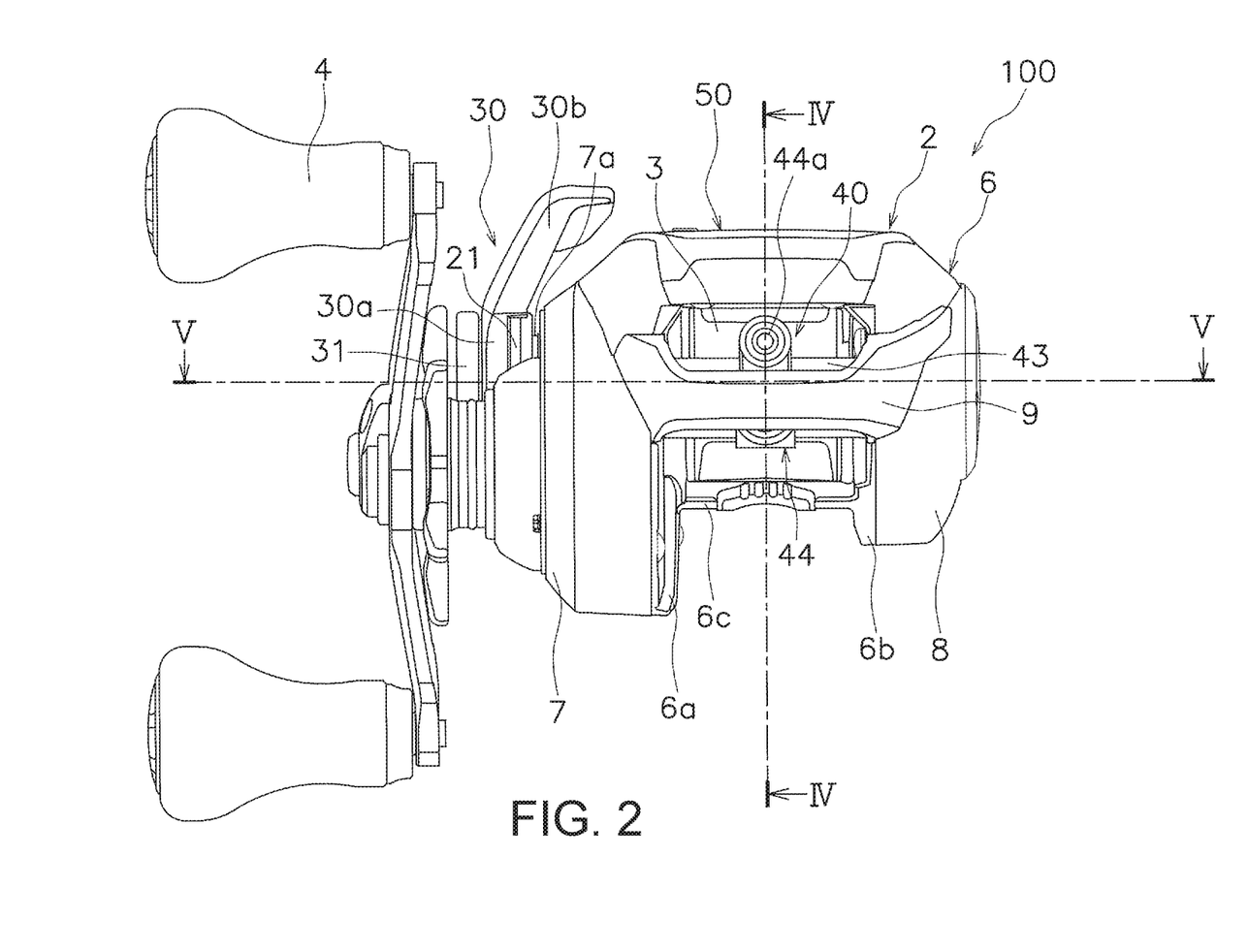
FIG. 2 is a front view of the dual-bearing reel of the first embodiment of the present disclosure.
Figure 3:
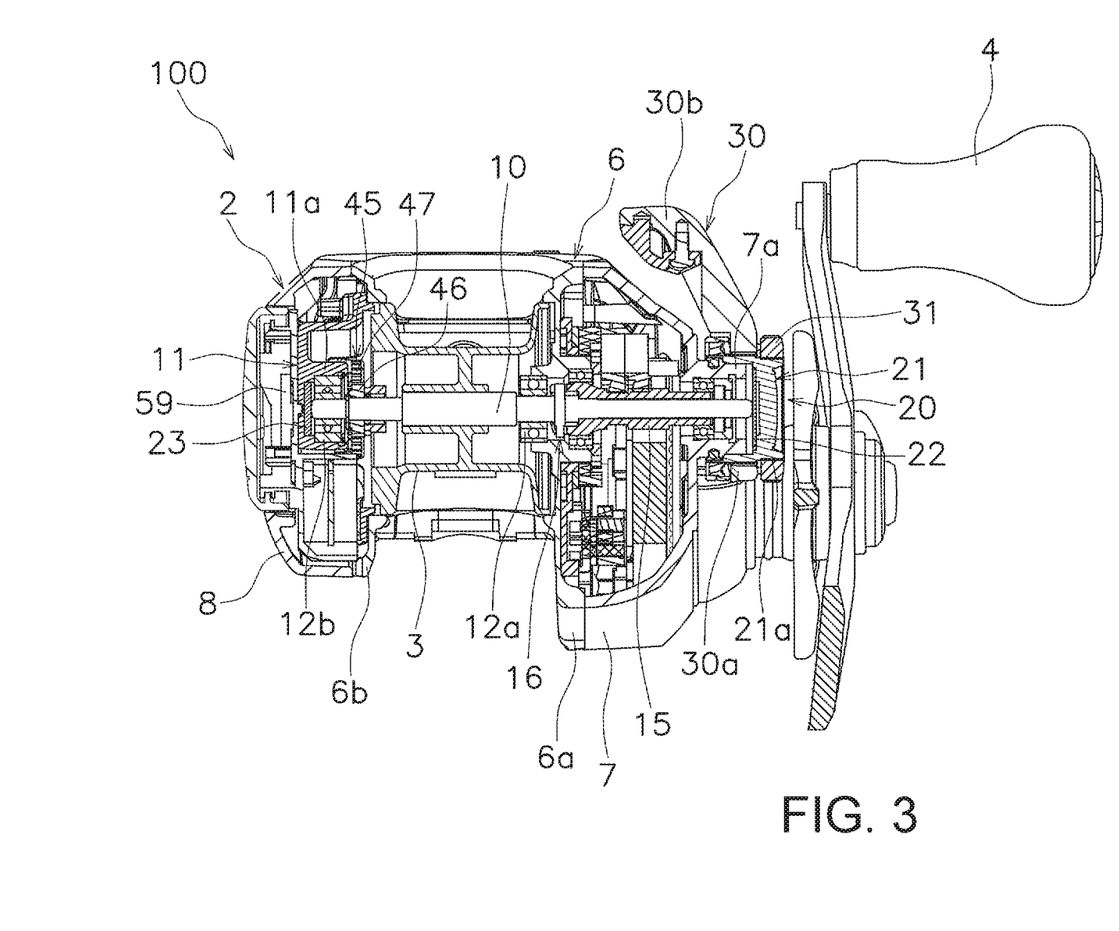
FIG. 3 is a cross-sectional view along line III-III in FIG. 1.
Figure 4:
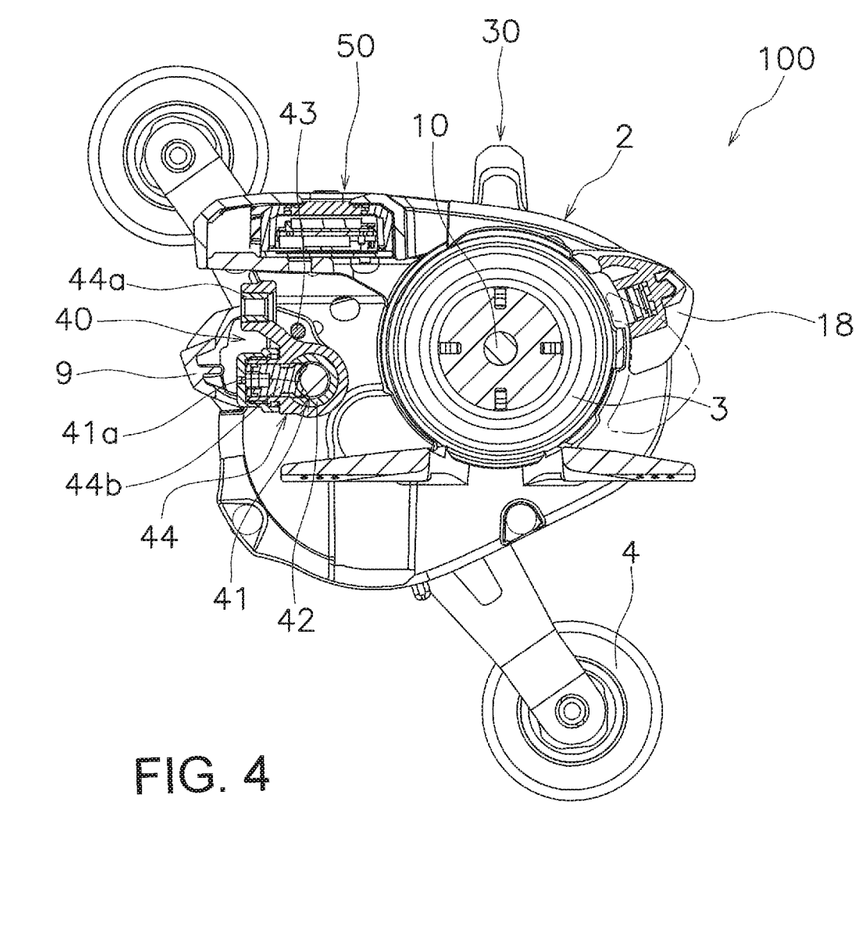
FIG. 4 is a cross-sectional view along line IV-IV in FIG. 2.

The first side cover 7 covers the right side of the first side plate 6a of the frame 6. As shown in FIG. 3, the first side cover 7 has a second boss 7a projecting outward in the axial direction. The second boss 7a is formed penetrating the first side cover 7 in the axial direction. A male thread is formed on the outer peripheral surface of the second boss 7a. The second side cover 8 covers the left side of the second side plate 6b of the frame 6. The front cover 9 covers the front of the frame 6. Specifically, as shown in FIGS. 2 and 4, the front cover 9 covers a part of the oscillating mechanism 40 from the front.

The spool 3 is rotatably supported by the reel body 2 between the first side plate 6a and the second side plate 6b. Further, as shown in FIG. 3, the spool 3 is supported by a spool shaft 10 penetrating the center of the spool 3 in the axial direction. Specifically, the spool 3 is fixed to the spool shaft 10 and integrally rotates with the spool shaft 10. The spool shaft 10 is rotatably supported by the reel body 2 via a pair of bearings 12a and 12b disposed in the reel body 2.

The handle 4 is rotatably supported by the reel body 2. The rotation of the handle 4 is transmitted to the spool 3 via a drag mechanism (not shown) and a pinion gear 15 mounted around the spool shaft 10.

As shown in FIG. 3, the dual-bearing reel 100 has a clutch mechanism 16 for switching between transmission and blocking of the rotational force to the spool 3 accompanying the rotation operation of the handle 4. The clutch mechanism 16 is switched between the clutch-on state and the clutch-off state by the operation of a clutch operating member 18 disposed at the rear of the reel body 2. The details of the clutch mechanism 16 and the clutch operating member 18 are the same as those of conventional configurations, so a detailed description thereof will be omitted.

The spool braking mechanism 20 is a mechanism for braking the rotation of the spool 3. In the present embodiment, by pressing the spool shaft 10, which is integrally rotating with the spool 3, in the axial direction, the braking force acting on the spool 3 is adjusted. The spool braking mechanism 20 has an adjusting member 21, a first friction plate 22, and a second friction plate 23.

The adjusting member 21 is provided in the reel body 2 to be movable in the axial direction and adjusts the braking force acting on the spool 3 by the movement thereof in the axial direction. The adjusting member 21 is a bottomed cylindrical member, and a female screw formed on the inner peripheral surface is screwed onto a male screw formed on the outer peripheral surface of the second boss 7a. Thus, when the adjusting member 21 is rotated, the adjusting member 21 moves in the axial direction with respect to the reel body 2. The adjusting member 21 has a male screw 21a on the outer peripheral surface thereof. A regulating member 31 described later is engaged with the male screw 21a.

The first friction plate 22 is disposed at the bottom of the adjusting member 21. The first friction plate 22 is in contact with one end face of the spool shaft 10. The second friction plate 23 is disposed at the bottom of the first boss 11a of the support member 11. The second friction plate 23 is in contact with the other end face of the spool shaft 10. Both ends of the spool shaft 10 are pressed in the axial direction by the first friction plate 22 and the second friction plate 23, whereby the rotation of the spool shaft 10 is braked. In addition, as a result of the movement of the adjusting member 21 in the axial direction, the pressing force against the spool shaft 10 changes, whereby the braking force acting on the spool 3 is adjusted.

The operating member 30 is movably provided on the reel body 2, and moves to perform an adjustment operation on the braking force acting on the spool 3. In the present embodiment, the operating member 30 is attached to the adjusting member 21. The operating member 30 can swing together with the adjusting member 21 in the rotation direction of the adjusting member 21. The adjusting member 21 moves in the axial direction in accordance with the swing of the operating member 30.

Figure 1:
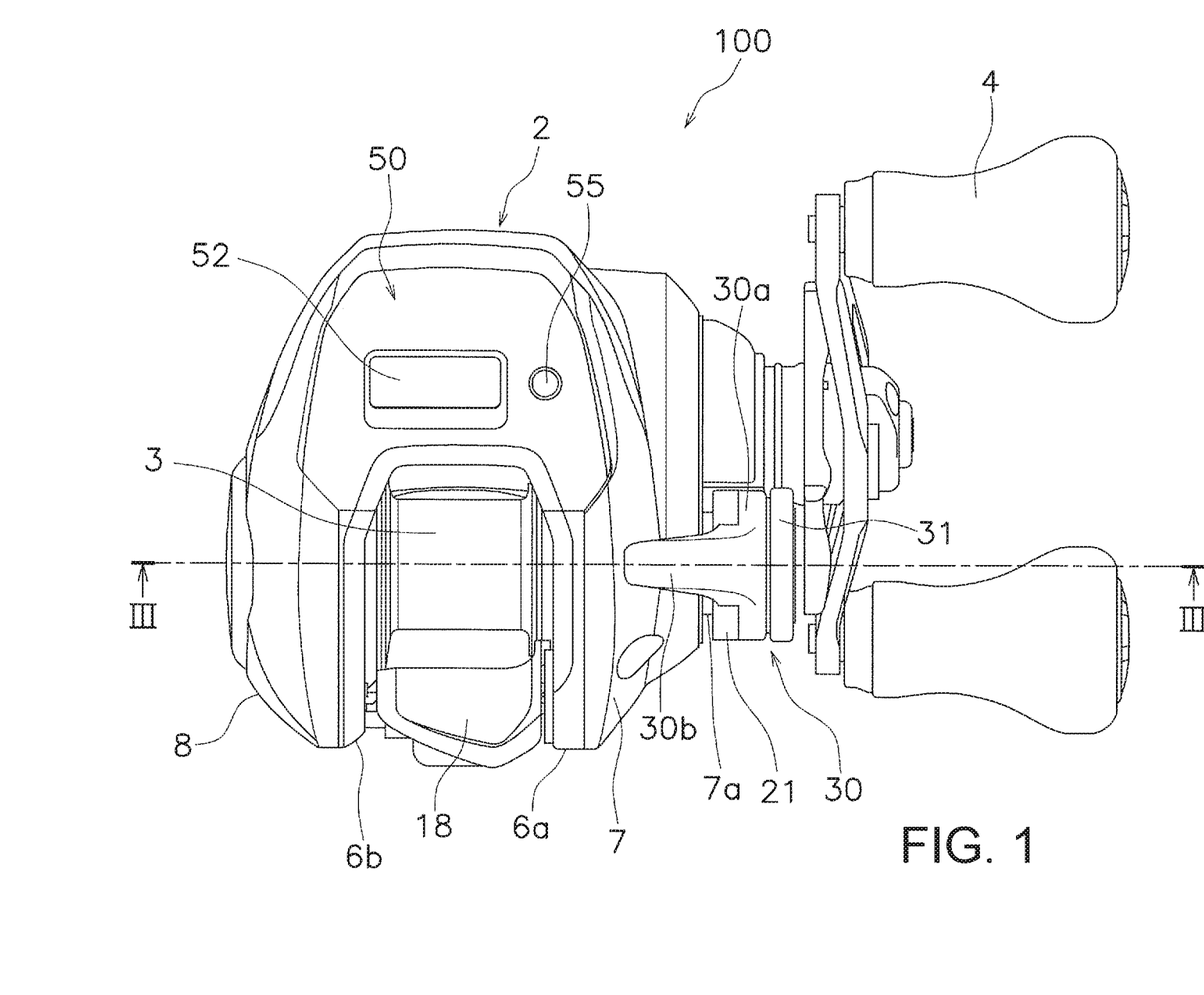
FIG. 1 is a plan view of the dual-bearing reel of a first embodiment of the present disclosure.

As shown in FIGS. 1 to 3, the operating member 30 has a mount 30a and an operation body 30b. The mount 30a is mounted on the outer periphery of the adjusting member 21 so as to be integrally rotatable with and detachable from the adjusting member 21.

The operation body 30b extends radially outward from the mount 30a and is inclined toward the inside of the reel body 2 while extending radially outward. Further, the operation body 30b has a distal end that is able to protrude further outward in the radial direction than an upper surface of the reel body 2.

For example, when the operation body 30b of the operating member 30 is pushed forward from the position shown in FIG. 1, the adjusting member 21 moves toward the first side cover 7. In this case, the pressing force of each of the first friction plate 22 and the second friction plate 23 against the spool shaft 10 increases, and so the braking force of the spool braking mechanism 20 increases. Conversely, when the operation body 30b of the operating member 30 is pushed rearward from the position shown in FIG. 1, the adjusting member 21 moves in a direction away from the first side cover 7. In this case, the pressing force of each of the first friction plate 22 and the second friction plate 23 against the spool shaft 10 decreases, and so the braking force of the spool braking mechanism 20 decreases.

Movement of the operating member 30 in the axial direction is restricted by the cylindrical regulating member 31 that engages with the male screw 21a of the adjusting member 21.

The oscillating mechanism 40 causes the fishing line to oscillate in the axial direction in synchronization with the rotation of the spool 3. Thus, the oscillating mechanism 40 is an example of a means for causing the fishing line to oscillate in the axial direction in synchronization with the rotation of the spool 3. As shown in FIGS. 2 and 4, the oscillating mechanism 40 has a shaft member 41, a guide member 42, a guide shaft 43, and a sliding member 44.

The shaft member 41 has a columnar shape, extends in the axial direction between the first side plate 6a and the second side plate 6b, and is rotatably supported by the reel body 2. The shaft member 41 has a spiral groove 41a on the outer peripheral surface thereof. The guide member 42 is arranged on the outer peripheral side of the shaft member 41. The guide member 42 and the guide shaft 43 extend in the axial direction between the first side plate 6a and the second side plate 6b and guide the movement of the sliding member 44 in the axial direction. The sliding member 44 has a line guide 44a for guiding the fishing line to the spool 3 and an engaging part 44b that engages with the spiral groove 41a of the shaft member 41. The sliding member 44 slides along the spiral groove 41a.

The line guide 44a is cylindrical and extends in the front-rear direction. As shown in FIG. 4, the line guide 44a is disposed above the spool shaft 10 when viewed from the side.

Figure 5:
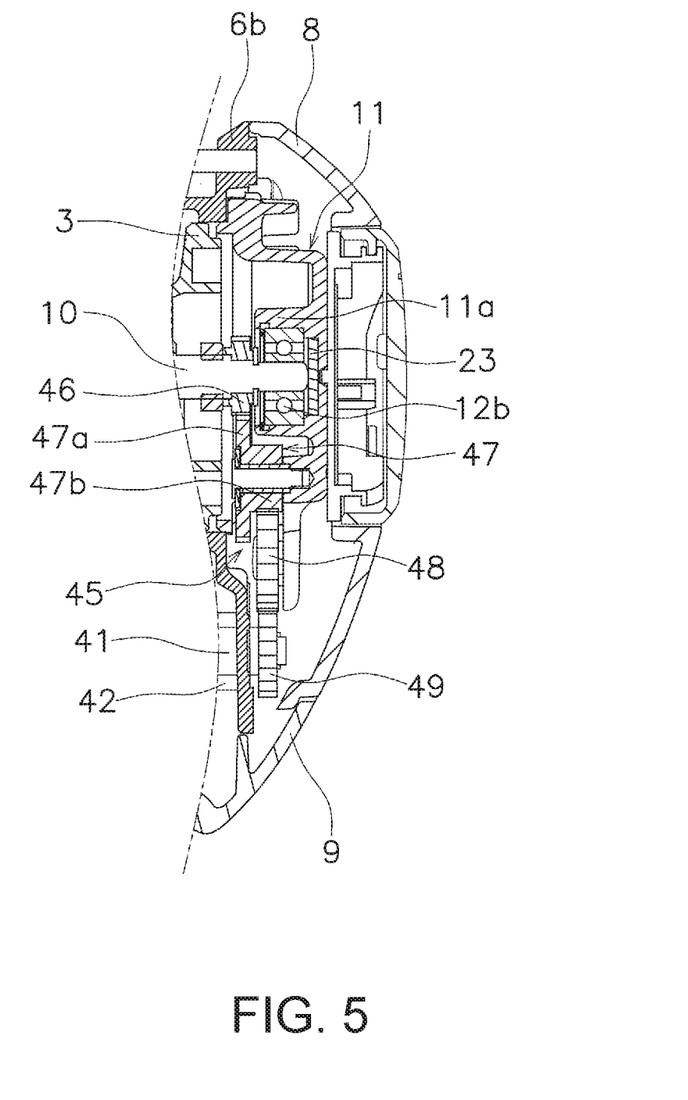
FIG. 5 is a partial enlargement of a cross-sectional view along line V-V in FIG. 2.

As shown in FIGS. 3 and 5, the rotation of the spool 3 is transmitted to the oscillating mechanism 40 via a rotation transmission mechanism 45 provided inside the second side cover 8. The rotation transmission mechanism 45 reduces the rotation speed of the spool 3 and transmits the rotation to the shaft member 41 of the oscillating mechanism. More specifically, the rotation transmission mechanism 45 has an input gear 46, a first intermediate gear 47, a second intermediate gear 48, and an output gear 49.

The input gear 46 is arranged around the axis of the spool shaft 10 and rotates integrally with the spool shaft 10. That is, in the present embodiment, the input gear 46 rotates integrally with the spool 3. As shown in FIG. 5, the first intermediate gear 47 is a stepped gear and has a large-diameter gear 47a and a small-diameter gear 47b. The large-diameter gear 47a is a gear that receives rotational input from the spool 3 side and meshes with the input gear 46. The small-diameter gear 47b is a gear having a diameter smaller than that of the large-diameter gear 47a and rotates concentrically and integrally with the large-diameter gear 47a. The small-diameter gear 47b meshes with the second intermediate gear 48 and outputs rotation to the shaft member 41 side. The first intermediate gear 47 and the second intermediate gear 48 are rotatably supported between the second side plate 6b and the support member 11 in the axial direction. The output gear 49 meshes with the second intermediate gear 48 and is coupled to the shaft member 41 so as to rotate integrally therewith. As a result, the rotation of the spool 3 is transmitted from the input gear 46 to the oscillating mechanism 40 via the first intermediate gear 47, the second intermediate gear 48, and the output gear 49, and the fishing line oscillates in the axial direction.

Here, the rotation of the input gear 46 is transmitted to the large-diameter gear 47a of the first intermediate gear 47, and the rotation of the input gear 46 is transmitted to the output gear 49 via the small-diameter gear 47b that integrally rotates with the large-diameter gear 47a. As a result, since the movement of the oscillating mechanism 40 in the axial direction is decelerated, the force with which the fishing line is pushed in the axial direction decreases. As a result, when, for example, reeling out the fishing line, the resistance that the fishing line receives from the line guide 44a decreases.

Figure 6:
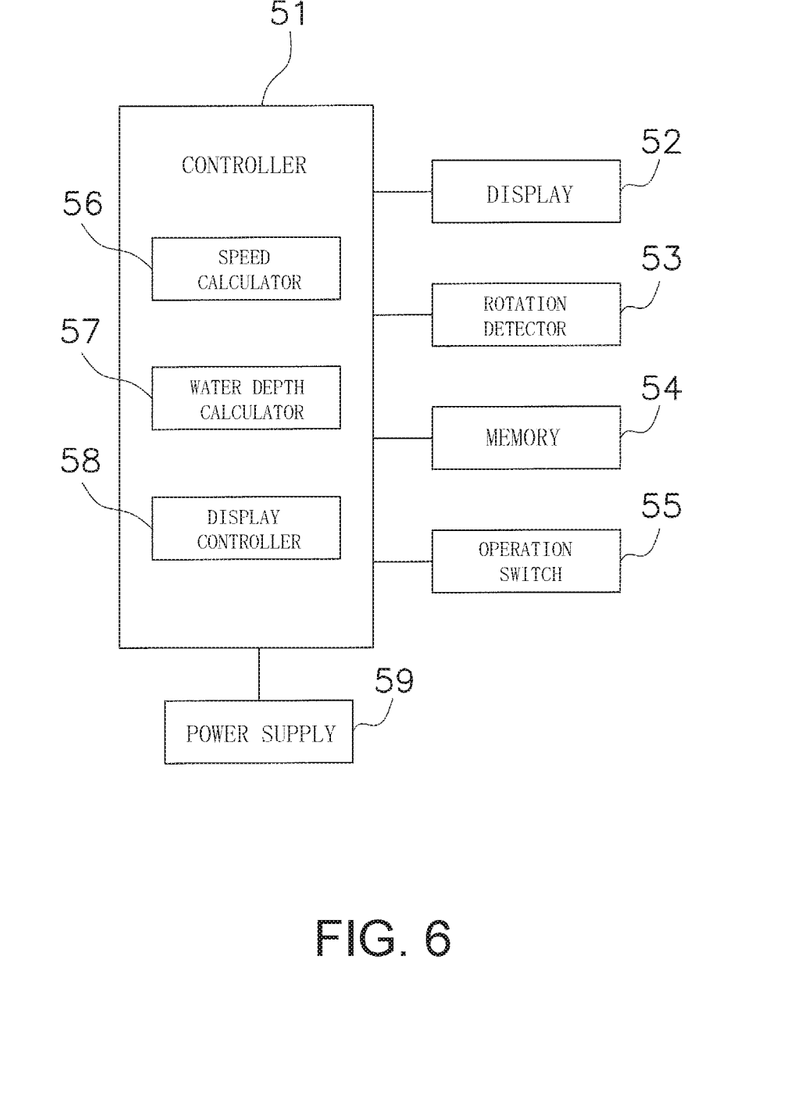
FIG. 6 is a block view showing a configuration of the control system of the dual-bearing reel.

The counter unit 50 is arranged at the upper part of the reel body 2. As shown in FIG. 6, the counter unit 50 includes a controller 51, a display 52, a rotation detector 53, a memory 54, and an operation switch 55.

The controller 51 includes a speed calculator 56, a water depth calculator 57, and a display controller 58. Power is supplied from a power supply 59 disposed inside the second side cover 8 to the controller 51. The power supply 59 is, for example, a disk-shaped alkaline battery. Note that the speed calculator 56 is an example of a speed calculating means for calculating at least a reeling-out speed of the fishing line according to the rotation of the spool 3, the water depth calculator 57 is an example of a water depth calculating means for calculating a water depth of a tackle in accordance with the rotation of the spool 3, and the display controller 58 is an example of a display control means for displaying in the display 52 the water depth of the tackle calculated by the water depth calculator 57.

The controller 51 includes a microcomputer, and controls the speed calculator 56, the water depth calculator 57, and the display controller 58 by software. The speed calculator 56 calculates at least the reeling-out speed of the fishing line according to the rotation of the spool 3. In the present embodiment, the speed calculator 56 calculates the reeling-out speed and reeling-in speed of the fishing line according to the rotation of the spool 3. In greater detail, the speed calculator 56 receives a signal from the rotation detector 53 and calculates the rotation speed of the spool 3. Specifically, for example, the rotation speed of the spool 3 is calculated based on the average number of rotations of the spool 3 in each predetermined time, or the average time of each predetermined rotation number of the spool 3. The rotation speed of the spool 3 can be calculated according to the change in the wound line diameter of the spool 3.

The water depth calculator 57 calculates the water depth according to the rotation of the spool 3. In greater detail, the water depth at which the tackle is disposed is calculated based on the length of fishing line fed from the spool 3. Specifically, based on the relationship between the number of rotations of the spool 3 and the water depth stored in advance in the memory 54, the water depth is calculated based on the number of times the spool 3 has rotated from a predetermined position.

The display controller 58 can display the rotation speed of the spool 3 calculated by the speed calculator 56 in the display 52. In greater detail, the display controller 58 converts the rotation speed to a predetermined number of steps set in advance in accordance with the rotation speed range of the spool 3, and displays the steps in the display 52. In addition, the display controller 58 displays the water depth of the tackle calculated by the water depth calculator 57 in the display 52.

As shown in FIG. 1, the display 52 is arranged on the upper portion of the reel body 2. In greater detail, the display 52 is a liquid crystal display arranged on an upper surface of the counter unit 50. Numbers, symbols, and some letters can be displayed in the display 52, and a step number set in advance is displayed in accordance with the water depth or rotation speed range of the spool 3 depending on the situation.

The rotation detector 53 has a reed switch or a Hall element that can detect a magnet (not shown) mounted on the spool 3. The rotation detector 53 detects the rotation of the spool 3. In greater detail, the rotation detector 53 detects the rotation number of the spool 3 and outputs a signal to the controller 51. The rotation detector 53 detects whether the spool 3 is rotating in the reeling-in direction or the reeling-out direction, and outputs a signal to the controller 51.

The memory 54 is, for example, rewritable flash memory. At least one of the relationships between the size of the spool 3 of the dual-bearing reel 100, the thickness of the fishing line and the number of revolutions of the spool 3 when the fishing line has been wound around the spool 3, and the length of the line is stored in the memory 54 as a factory default. It should be noted that these relationships can be stored in the memory 54 by a known learning process.

The operation switch 55 is disposed on the right side (the side of the first side cover 7) of the display 52. The operation switch 55 is constituted by, for example, a push button. By operating the operation switch 55 with different operation methods (for example, a long press and a double click), various setting operations can be performed.

In the dual-bearing reel 100 having the above structure, the oscillating mechanism 40 oscillates in the axial direction in synchronization with the rotation of the spool 3. Thereby, when the fishing line is reeled out from the spool 3, the line guide 44a of the oscillating mechanism 40 moves in the axial direction in synchronization with the rotation of the spool 3. Therefore, there is no lateral deviation between the position of the fishing line fed from the spool 3 and the position of the line guide 44a of the oscillating mechanism 40. As a result, the fishing line can be smoothly fed out from the spool 3, and a stable falling speed can be obtained. Further, by adjusting the braking force acting on the spool 3 with the operating member 30 while checking the water depth of the tackle or the delivery speed of the tackle displayed in the display 52, it is possible to easily obtain a falling speed of the tackle suitable for the situation.

Other Embodiments

One embodiment of the present disclosure was described above, but the present disclosure is not limited to the aforementioned embodiment. It should be understood various changes can be made without departing from the scope of the present advancement. Specifically, a plurality of the embodiments disclosed in the present specification can be arbitrarily combined with each other according to necessity.

Figure 7:
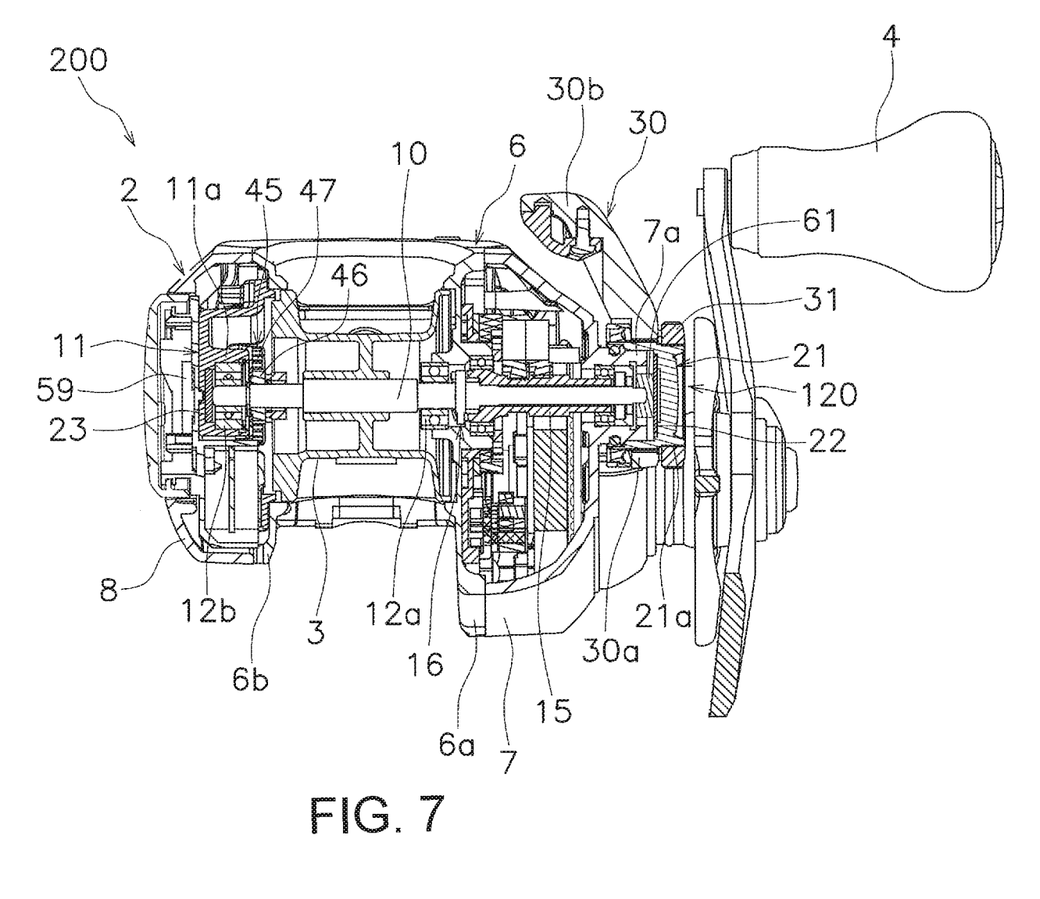
FIG. 7 is a drawing corresponding to FIG. 3 of another embodiment.

(a) In the aforementioned embodiment, the spool braking mechanism 20 is configured so as to press the spool shaft 10 rotating integrally with the spool 3 in the axial direction, but the present advancement is not limited to this structure. For example, frictional resistance can also be applied by making contact with the spool shaft 10 or the spool 3 in the radial direction. As shown in FIG. 7, a braking force can be applied to an engaging member 61 that is engaged with the spool shaft 10 so as to rotate integrally therewith. Specifically, in a spool braking mechanism 120 of a dual-bearing reel 200, the engaging member 61 covering the distal end of the spool shaft 10 makes contact with the second friction plate 23, whereby the rotation of the spool shaft 10 is braked. In this case, the area of contact with the second friction plate 23 is increased by the engaging member 61, and so the braking force is also increased. Therefore, for example, in a reel in which the diameter of the spool 3 is large, it is possible to adjust the braking force only by slightly operating the operating member 30.

(b) In the aforementioned embodiment, the operating member 30 is attached to the adjusting member 21, but the adjusting member 21 and the operating member 30 can be integrally formed. In addition, provided the operating member 30 can be operated by a finger of a hand grasping the reel, the mode of operation does not matter, and can for example be a dial or slide lever instead of a lever.

(c) In the aforementioned embodiment, the braking force is directly applied to the spool 3, but the present advancement is not limited to this structure. The braking force can be applied to the gears constituting the rotation transmission mechanism 45 for transmitting the rotation from the spool 3 to the oscillating mechanism 40.

(d) The spool braking mechanism 20, by being additionally provided with a one-way clutch, can be configured so as to apply the braking force only in the direction of the spool 3 reeling out the fishing line.

In the aforementioned embodiment, the present advancement was described by taking as an example the dual-bearing reel 100 that performs winding by the operation of the handle 4, but the present disclosure can also be applied to an electric reel that can perform winding by the driving of a motor.

EXPLANATION OF REFERENCE NUMERALS

2 Reel body
3 Spool
9 Front cover
10 Spool shaft
21 Adjusting member
22 First friction plate
23 Second friction plate
30 Operating member
30a Mount
30b Operation body
40 Oscillating mechanism
41 Shaft member
41a Spiral groove
44 Sliding member
44a Line guide
45 Rotation transmission mechanism
47a Large-diameter gear
47b Small-diameter gear 52 Display
56 Speed calculator (an example of speed calculating means)
57 Water depth calculator (an example of water depth calculating means)
58 Display controller (an example of display control means)
100 Dual-bearing reel

What is claimed is:

1. A dual-bearing reel configured to reel in and reel out a fishing line, comprising:
   a reel body;
   a spool that is rotatably supported by the reel body;
   a spool shaft that supports the spool;
   an operating member that is movably provided on the reel body and that moves to perform an adjustment operation on a braking force that acts on the spool;
   an oscillating mechanism that causes the fishing line to oscillate in an axial direction in synchronization with a rotation of the spool;
   a display provided in the reel body;
   a water depth calculator that calculates a water depth of a tackle in accordance with the rotation of the spool;
   a speed calculator that calculates at least a reeling-out speed of the fishing line in accordance with the rotation of the spool; and
   a display controller that displays in the display the water depth of the tackle calculated by the water depth calculator and the speed calculated by the speed calculator.

2. The dual-bearing reel according to claim 1, further comprising:
   a first friction plate that makes contact with one end face of the spool shaft; and
   a second friction plate that makes contact with the other end face of the spool shaft,
   wherein the spool shaft rotates integrally with the spool, and
   the operating member moves to adjust a pressing force of each of the first and second friction plates against the spool shaft.

3. The dual-bearing reel according to claim 1, further comprising:
   an adjusting member that is provided to be movable in an axial direction of the spool shaft, and that moves in the axial direction to adjust the braking force that acts on the spool,
   wherein the operating member is attached to the adjusting member and is configured to swing together with the adjusting member in a rotation direction of the adjusting member.

4. The dual-bearing reel according to claim 3, wherein the operating member includes
   a mount that is integrally rotatable with and detachable from the adjusting member, and
   an operation body that extends radially outward from the mount and is inclined toward the inside of the reel body, extending radially outward.

5. The dual-bearing reel according to claim 4, wherein the operation body of the operating member has a distal end that protrudes further outward in a radial direction than an upper surface of the reel body.

6. The dual-bearing reel according to claim 1, wherein the oscillating mechanism includes a line guide that guides the fishing line, and
   the line guide is disposed above the spool shaft when viewed from a side.

7. The dual-bearing reel according to claim 1, wherein the oscillating mechanism includes
   a shaft member rotatably supported by the reel body, including a spiral groove on an outer peripheral surface of the shaft member, and extending in the axial direction of the spool shaft,
   a sliding member that slides along the spiral groove, and
   a rotation transmission mechanism that includes an input gear arranged around an axis of the spool shaft, and that transmits the rotation of the spool to the shaft member of the oscillating mechanism.

8. The dual-bearing reel according to claim 7, wherein the rotation transmission mechanism reduces a rotation speed of the spool and transmits the rotation to the shaft member.

9. The dual-bearing reel according to claim 8, wherein the rotation transmission mechanism includes a large-diameter gear that receives a rotational input from the spool, and a small-diameter gear that rotates concentrically and integrally with the large-diameter gear and that outputs a rotation to the shaft member.

10. The dual-bearing reel according to claim 1, wherein the display is disposed to overlap at least partially with the oscillating mechanism when viewed from above.

* * * * *